United States Patent
Berger et al.

(10) Patent No.: US 11,577,747 B2
(45) Date of Patent: Feb. 14, 2023

(54) METHOD FOR OPERATING AT LEAST ONE AUTOMATED VEHICLE

(71) Applicant: Robert Bosch GmbH, Stuttgart (DE)

(72) Inventors: Ingmar Berger, Muehlacker (DE); Jorge Sans Sangorrin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 16/963,209

(22) PCT Filed: Jan. 9, 2019

(86) PCT No.: PCT/EP2019/050412
§ 371 (c)(1),
(2) Date: Jul. 17, 2020

(87) PCT Pub. No.: WO2019/166143
PCT Pub. Date: Sep. 6, 2019

(65) Prior Publication Data
US 2021/0122392 A1    Apr. 29, 2021

(30) Foreign Application Priority Data

Feb. 28, 2018 (DE) .......................... 102018202966.0

(51) Int. Cl.
*B60W 60/00* (2020.01)
*G01C 21/34* (2006.01)
(Continued)

(52) U.S. Cl.
CPC ....... *B60W 60/001* (2020.02); *G01C 21/3453* (2013.01); *G08G 1/0112* (2013.01);
(Continued)

(58) Field of Classification Search
CPC .......... B60W 60/001; B60W 2556/50; B60W 2420/42; G08G 1/0112; G08G 1/0116;
(Continued)

(56) References Cited

U.S. PATENT DOCUMENTS 8,954,205 B2 * 2/2015 Sagar ..................... G08G 1/164
701/1
9,715,829 B2 * 7/2017 Buchholz ............... G08G 1/166
(Continued)

FOREIGN PATENT DOCUMENTS

| CN | 105513421 A | 4/2016 |
| CN | 107735824 A | 2/2018 |

(Continued)

OTHER PUBLICATIONS

International Search Report for PCT/EP2019/050412, dated May 15, 2019.

*Primary Examiner* — Luis A Martinez Borrero
(74) *Attorney, Agent, or Firm* — Norton Rose Fulbright US LLP; Gerard Messina

(57) ABSTRACT

A method for operating at least one automated vehicle, including the steps: detecting road users by sensors with the aid of the at least one automated vehicle and/or with the aid of sensor systems in an infrastructure; ascertaining predicted traffic routes for the road users with the aid of a computing device based on defined criteria; transmitting control data corresponding to the predicted traffic route to the automated vehicle; and operating the automated vehicle according to the control data.

17 Claims, 2 Drawing Sheets

(51) Int. Cl.
*G08G 1/01* (2006.01)
*G08G 1/0967* (2006.01)

(52) U.S. Cl.
CPC ..... *G08G 1/0116* (2013.01); *G08G 1/096725* (2013.01); *G08G 1/096741* (2013.01); *G08G 1/096783* (2013.01); *B60W 2420/42* (2013.01); *B60W 2420/52* (2013.01); *B60W 2420/54* (2013.01); *B60W 2556/50* (2020.02)

(58) Field of Classification Search
CPC ....... G08G 1/096725; G08G 1/096741; G08G 1/096783; G01C 21/3453
See application file for complete search history.

(56) References Cited

U.S. PATENT DOCUMENTS

| | | | | |
|---|---|---|---|---|
| 10,037,689 | B2* | 7/2018 | Taylor | G05D 1/0285 |
| 10,220,850 | B2* | 3/2019 | Naserian | F02D 41/042 |
| 10,595,175 | B2* | 3/2020 | Ramalho de Oliveira | G08G 1/0112 |
| 10,692,365 | B2* | 6/2020 | Ran | G08G 1/0145 |
| 10,803,746 | B2* | 10/2020 | Bai | G06V 10/82 |
| 10,933,876 | B2* | 3/2021 | Naserian | G08G 1/096783 |
| 10,991,243 | B2* | 4/2021 | Raamot | G08G 1/08 |
| 2014/0358324 | A1* | 12/2014 | Sagar | G08G 1/164 701/1 |
| 2014/0372016 | A1* | 12/2014 | Buchholz | G08G 1/166 701/117 |
| 2016/0231746 | A1* | 8/2016 | Hazelton | G05D 1/0274 |
| 2017/0337813 | A1* | 11/2017 | Taylor | G05D 1/0285 |
| 2018/0004213 | A1* | 1/2018 | Absmeier | B60W 30/0956 |
| 2018/0129215 | A1* | 5/2018 | Hazelton | G05D 1/0274 |
| 2018/0215386 | A1* | 8/2018 | Naserian | B60W 50/0097 |
| 2018/0376305 | A1* | 12/2018 | Ramalho de Oliveira | H04W 4/44 |
| 2019/0068434 | A1* | 2/2019 | Moreira da Mota | H04L 41/40 |
| 2019/0096238 | A1* | 3/2019 | Ran | G08G 1/0145 |
| 2019/0143981 | A1* | 5/2019 | Naserian | B60W 30/18154 701/55 |
| 2019/0164422 | A1* | 5/2019 | Bai | G08G 1/0112 |
| 2019/0244518 | A1* | 8/2019 | Cheng | G08G 1/0145 |
| 2020/0200563 | A1* | 6/2020 | Martin | G08G 1/0145 |
| 2020/0201353 | A1* | 6/2020 | Martin | G01C 21/3415 |
| 2020/0202711 | A1* | 6/2020 | Martin | G08G 1/0145 |
| 2020/0229206 | A1* | 7/2020 | Badic | H04W 16/32 |
| 2020/0234582 | A1* | 7/2020 | Mintz | G08G 1/0145 |
| 2020/0239031 | A1* | 7/2020 | Ran | H04W 4/46 |
| 2020/0255026 | A1* | 8/2020 | Katardjiev | B60W 10/20 |
| 2020/0257301 | A1* | 8/2020 | Weiser | G06N 3/02 |
| 2020/0341487 | A1* | 10/2020 | Hazelton | G01S 13/84 |
| 2021/0114616 | A1* | 4/2021 | Altman | H04W 8/205 |
| 2021/0233396 | A1* | 7/2021 | Guo | G08G 1/0145 |
| 2021/0295686 | A1* | 9/2021 | Cross | G08G 1/005 |
| 2021/0368308 | A1* | 11/2021 | Katardjiev | H04L 67/104 |

FOREIGN PATENT DOCUMENTS

| | | |
|---|---|---|
| DE | 10210546 A1 | 9/2003 |
| DE | 102009008745 A1 | 8/2010 |
| DE | 102013005362 A1 | 10/2013 |
| DE | 102012021282 A1 | 4/2014 |
| DE | 102014224104 A1 | 6/2016 |
| DE | 102015216881 A1 | 3/2017 |
| DE | 102015224338 A1 | 6/2017 |
| EP | 2814014 A1 | 12/2014 |
| EP | 2911926 A2 | 9/2015 |
| WO | 2014067638 A2 | 5/2014 |

* cited by examiner

METHOD FOR OPERATING AT LEAST ONE AUTOMATED VEHICLE

FIELD

The present invention relates to a method for operating at least one automated vehicle. The present invention furthermore relates to a device for operating at least one automated vehicle. The present invention furthermore relates to a computer program product.

BACKGROUND INFORMATION

The field of driver assistance systems and of automated driving has markedly gained in importance in the automotive industry. With the introduction of standard tests, such as the Euro NCAP 2018 testing guidelines, functions such as anticipatory pedestrian protection and autonomous emergency braking assistance will be part of the standard equipment in all vehicle classes within a foreseeable time. Additionally, the equipment rate of vehicles with driver assistance functions for the combined transverse and longitudinal guidance will steadily increase in the future. These will have a high availability, in particular, on expressways and well-designed rural roads and will thus allow relaxed driving outside of urban areas.

Sensors such as radar, ultrasound, video cameras, LIDAR, etc. detect the vehicle surroundings in the process. With the aid of this surroundings detection, road users and infrastructure in the surroundings of the vehicle may be identified. Further technologies, such as the navigation system and GPS-based localization systems, are already standard equipment in many new vehicles.

Another class of driver assistance systems is the so-called parking assistance functions, which are presently available in initial series vehicles. Several of them even today allow the parking process to be controlled via a special app on the smart phone.

However, the detection ability of sensor systems installed in the vehicle is limited with respect to the surroundings perception in complex scenarios, as they frequently exist in inner-city scenarios. This may result in a limited availability of highly automated systems. For example, hidden areas and/or nearby objects in the surroundings of the vehicle may result in a limited surroundings identification with the aid of the described sensor systems. A large number of objects situated within a limited space may even further limit the surroundings identification.

One option for obtaining pieces of information about the surroundings is technologies for vehicle-to-vehicle and vehicle-to-infrastructure communication, which are in the process of being developed and will be part of the standard equipment in all vehicles in the medium to long term. In the near future, communication technologies will even enable a real time transmission of data.

At the present point in time, LTE is the worldwide standard for mobile communication. It is already available worldwide in many regions and allows transmission rates of up to 300 MBit/s or, in its latest version, 4G/LTE+ up to 4,000 MBit/s. At the same time, the successor 5G is already waiting at the starting blocks. It will enable mobile communication in real time with transmission rates of up to 10,000 MBit/s and with latencies <1 ms.

Since the launch of the first iPhone®, the smart phones now equipped standard with these technologies have replaced the desired cell phones within a very short time. Regardless of age, almost every adult today has a smart phone. Even less expensive models are now equipped with GPS, Bluetooth and LTE technology.

Driver assistance systems and systems for automated driving carry out calculations to estimate the development (prediction) of the traffic situation. Based on this estimation, the system decides the appropriate behavior of the vehicle in the form of, e.g., a trajectory. Behavior models are stored to carry out the prediction of the situation for the individual road users. These behavior models include pieces of information about the movement options of different object types and evaluate their interaction with other road users as well as the jointly used infrastructure. For example, a vehicle is able to move much more quickly than pedestrians, whereas a pedestrian is able to stop almost immediately. Each prediction of the situation becomes more uncertain with increasing prediction time. The uncertainty is essentially due to two factors:

On the one hand, the pieces of information about the other road users detected with the aid of the vehicle's own surroundings sensor system may be noisy and/or incomplete.

On the other hand, a prediction based on behavior models is only possible with a limited anticipation of the future. This is due to the number of possible behavior options which a road user is able to perceive within a very short time.

In conventional systems, all these calculations take place without more detailed pieces of information, which also cannot be detected via the installed sensor system.

European Patent No. EP 2 911 926 B1 describes a method in which vehicles collect pieces of surroundings information, an exchange of the pieces of surroundings information across multiple vehicles being provided.

German Patent Application No. DE 102 10 546 A1 describes a method for automatic vehicle guidance in which infrastructure data are wirelessly transmitted to the vehicle, and commands for the vehicle guidance are calculated based on the infrastructure data. It is provided in the process that the infrastructure data for at least one section of the route immediately situated ahead are loaded into a vehicle's own memory, that the instantaneous position of the vehicle is continuously determined with the aid of a precise positioning system, and that the commands are calculated based on the position data and the stored infrastructure data.

SUMMARY

It is an object of the present invention to provide an alternative method for operating at least one automated vehicle.

According to a first aspect of the present invention, the object may be achieved by an example method for operating at least one automated vehicle, including the steps:

detecting road users by sensors with the aid of the at least one automated vehicle and/or with the aid of sensor systems in an infrastructure;

ascertaining predicted traffic routes for the road users with the aid of a computing device based on defined criteria;

transmitting control data corresponding to the predicted traffic route to the automated vehicle; and operating the automated vehicle according to the control data.

Advantageously, in this way no complex sensor system is required in the automated vehicle since important pieces of information or data about the surroundings of the vehicle are so-to-speak "situated in the network." A "central intelligence" is thereby implemented, which is not based on individual vehicles. In this way, a functionality including many services for operating the automated vehicle is advantageously provided, whereby, in particular, in urban areas, an at least partial operation of the automated vehicle may be implemented with the aid of the central intelligence.

According to a second aspect of the present invention, the object may be achieved by an example device for operating at least one automated vehicle in accordance with the present invention, including:
- a sensor unit for detecting road users with the aid of the at least one automated vehicle and/or with the aid of sensor systems in an infrastructure;
- a computing device for calculating predicted traffic routes for the road users with the aid of a computing device based on defined criteria; and
- a transmission unit for transmitting control data corresponding to the predicted traffic route to the automated vehicle.

Advantageous refinements of the example method are described herein.

One advantageous refinement of the example method provides for the control data to be designed as trajectory data. In this way, the automated vehicle may be guided by a central entity, which has an optimized overall view of the situation and is thereby able to optimally control the traffic situation.

One further advantageous refinement of the example method provides that the surroundings are detected via sensors by the road users, the sensor data being transmitted to the computing device. In this way, the central computing device is advantageously enabled to use a large number of data of the road users for an optimized ascertainment of a predictive traffic model.

One further advantageous refinement of the example method is characterized in that the computing device transmits control data for defined sub-routes to the automated vehicle. In this way, the method may be applied in a regionally specific manner and, in particular, in regions having particularly high traffic volume.

One further advantageous refinement of the example method provides that the method is controlled in the automated vehicle with the aid of a human machine interface. In this way, a comfortable control option of the method is supported, for example with the aid of a touch screen of the automated vehicle and/or a touch screen of a cell phone. It may thus be graphically displayed to the user that a network including the above-explained control options is available. Using a corresponding input with the aid of the human machine interface, the driver may thereupon accept that the vehicle is automatically controlled with the aid of the described network.

One further advantageous refinement of the example method provides that the computing device uses a digital map for ascertaining the predicted traffic routes for the road users. In this way, circumstances may be provided for the computing device, so that the ascertainment of the predicted traffic model may be carried out even more precisely.

One further advantageous refinement of the example method provides that at least one traffic infrastructure unit is controlled with the aid of the computing device. In this way, it is possible, for example, to handle traffic lights and/or lights of barrier systems to control traffic flows even better.

The present invention is described in greater detail hereafter with further features and advantages based on two figures. The figures are primarily intended to illustrate the main features of the present invention.

Described method features result similarly from correspondingly described device features, and vice versa. This means in particular that features, technical advantages and statements regarding the method result similarly from corresponding statements, features and advantages of the device, and vice versa.

DETAILED DESCRIPTION OF EXAMPLE EMBODIMENTS

Hereafter, the term "automated motor vehicle" is used synonymously to mean semi-automated motor vehicle, autonomous motor vehicle and semi-autonomous motor vehicle.

An automated or autonomous vehicle is a vehicle which does not require a driver. The vehicle drives autonomously, for example, by automatically detecting a course of the road, other road users or obstacles and by calculating appropriate control commands in the vehicle, and by forwarding these to actuators in the vehicle, whereby the driving course of the vehicle is correctly influenced. The driver is no longer involved in the driving process in the case of a fully autonomous vehicle.

Vehicle-to-vehicle communication (Car2Car or C2C) is understood to mean the exchange of pieces of information and data between motor vehicles.

The particular vehicles collect data, such as ABS interventions, steering angle, position, direction, speed, etc. and transmit these data via radio (such as via WLAN, UMTS, etc.) to other road users. The "range of vision" of the driver is to be increased by electronic means. Vehicle-to-infrastructure communication (C2I) is understood to mean the exchange of data between a vehicle and the surrounding infrastructure (e.g., traffic lights).

The aforementioned technologies are based on the cooperation of sensors of the different road users and use latest methods of communication technology for exchanging these pieces of information. It is provided for this purpose that autonomous or semi-autonomous vehicles exchange data among one another with the aid of car-to-car communication systems.

At present, the calculations for the automated driving take place exclusively on the automated vehicle. For this purpose, usually high performance computing cores are used to be able to promptly process the high data volume arising in the process. Such computing systems, however, are relatively expensive, take up a lot of space in the vehicle, and may reach their limits with respect to the computing load as a result of the steadily growing number of sensor systems in the vehicle.

For the transfer of calculations into the cloud, it may be advantageous to provide a copy of a calculation rule for the automated driving ("artificial intelligence") in the cloud. The copy of the artificial intelligence in the cloud may correspond exactly to the artificial intelligence on the automated vehicle or may be designed differently from the artificial intelligence of the automated vehicle in a defined manner. An identical copy of the artificial intelligence of the automated vehicle in the cloud has the essential advantage that, with the same input data, calculation results of the cloud do not differ from calculation results on the automated vehicle. Advantageously, the copy of the artificial intelligence in the cloud takes place for entire vehicle variants or vehicle families.

Figure 1:
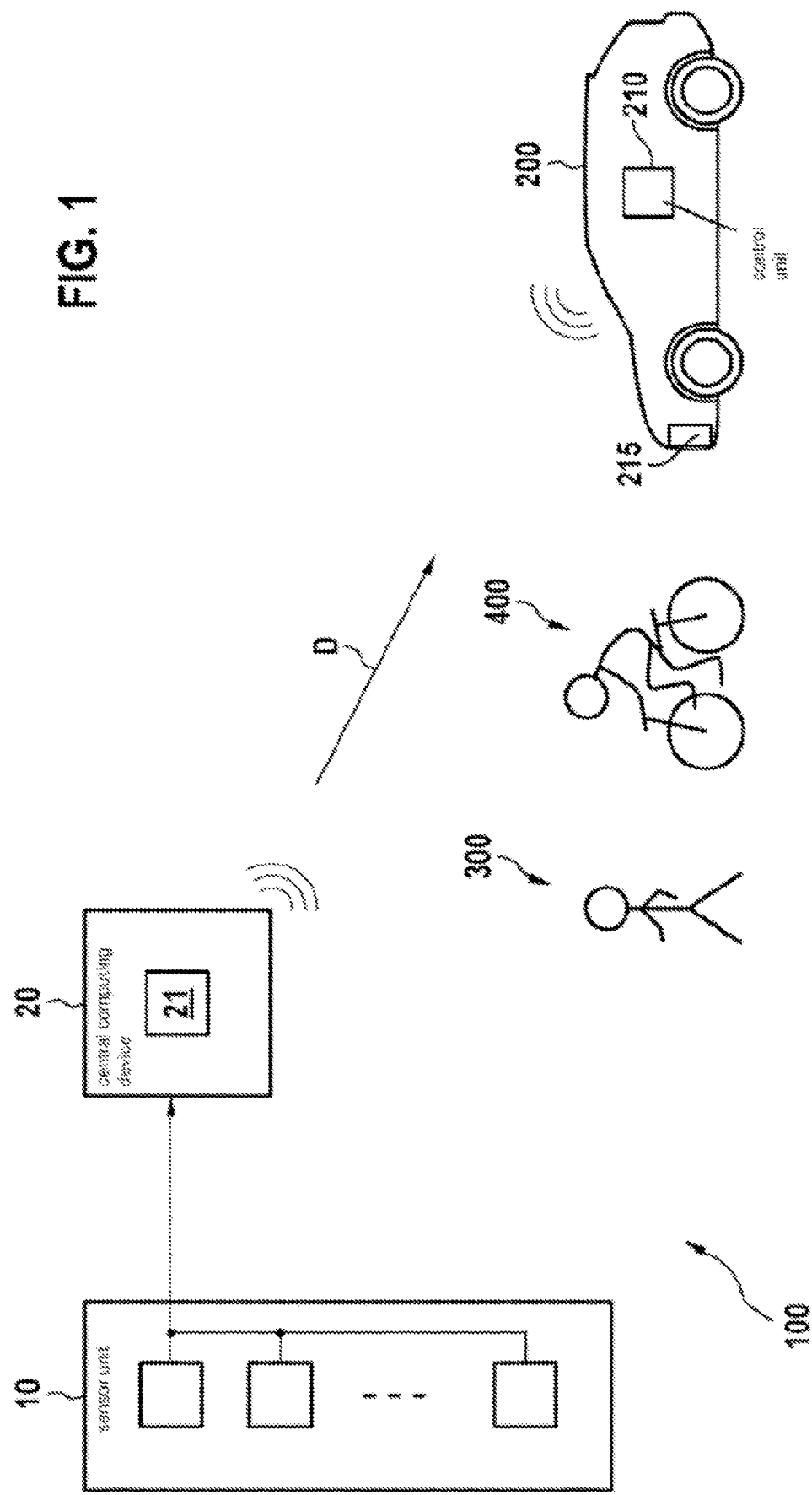
FIG. 1 shows a schematic representation of one scenario for carrying out the provided method.

FIG. 1 shows a highly schematic, exemplary scenario of a provided method for operating at least one automated vehicle 200. A preferably fixedly installed sensor unit 10 (e.g., in the form of a camera, radar, etc.) is apparent in the surroundings, with the aid of which a surroundings scenario is detected, which, e.g., encompasses automated vehicle 200, pedestrians 300, bicyclists 400, animals (not shown), etc. For the sake of simplicity, only one of each of the described road users is shown; however, it shall be understood that the method may be applied with a plurality of automated vehicles 200, pedestrians 300, bicyclists 400, etc.

Sensor unit 10 transmits the data to a central computing device 20, which calculates a predictive traffic model including a predicted traffic route for the at least one automated vehicle 200 from the ascertained sensor data. Defined criteria may be used for the creation of the predictive traffic model, for example a consideration of congestion situations, accident situations, accumulations of road users, weather conditions, etc.

With the aid of a transmission unit 21 situated inside or outside computing device 20, control data D corresponding to the predicted traffic model, e.g., in the form of trajectory data, are thereafter wirelessly transmitted to automated vehicle 200. For this purpose, a high speed or real time data link is preferably provided, with the aid of which a real time communication is carried out with automated vehicle 200. A control unit 210 situated within vehicle 200 (e.g., in the form of control devices, actuators, etc.) may control automated vehicle 200 according to the transmitted trajectory data. In one variant, it is also conceivable that, in addition to the trajectory data, other types of control data, e.g., control data for the actuators, are transmitted to automated vehicle 200 as well. It is also conceivable that infrastructure installations (e.g., traffic lights, barrier systems, etc.) are operated with the aid of control data D.

In this way, a device 100 for autonomously controlling connected road users, preferably on arterial roads, is advantageously provided to enable drivers of automated vehicles 200 a relaxed driving within urban areas. For this purpose, automated vehicles 200 advantageously only have to include a minor equipment of sensor systems. Device 100 provides connected automated vehicles 200 with control commands in real time in the process, device 100 not providing any pieces of information whatsoever about the surroundings. In this way, the sensor system is "centrally" developed virtually for all road users.

In one advantageous refinement of device 100, it may be provided that sensor data detected by the road users using a sensor 215 are wirelessly transmitted to computing device 20, these data then being used by the computing device 20 for the improved ascertainment of the predictive traffic model.

The transmission of the described data to computing device 20 may preferably take place based on conventional vehicle-to-vehicle and/or vehicle-to-infrastructure communication.

In this way, an uncertainty in the prediction of the traffic situation may advantageously be significantly reduced. The prediction time and a certainty about the prediction may advantageously be considerably increased, by which a degree of automation of the entire system is increased, by which ultimately an automated operation of automated vehicle 200 is available considerably longer and more frequently. This is particularly useful in the urban surroundings having a high traffic density and an at least intermittently very high number of road users.

In the further variant of device 100, it may be provided that computing device 20 uses a digital map in which data of the surroundings are stored for ascertaining the predictive traffic model. In this way, the ascertainment of the predictive traffic model may be carried out even better and more quickly by computing device 20.

Advantageously, it is possible for a driver of automated vehicle 200 to establish a communication link to device 100 via a human machine interface, and to utilize the provided services in this way.

In one exemplary scenario, a driver of automated vehicle 200 drives into a city having a higher traffic volume. With the aid of a human machine interface (e.g., touch screen), the driver receives the message that services of device 100 are available. The driver thereupon accepts the offered services on the touch screen, whereby vehicle 200 communicates relevant data (e.g., type, extent, navigation destination, etc.) to central computing device 20.

Computing device 20 localizes automated vehicle 200 within the stored digital map and ascertains the trajectory which vehicle 200 is to travel, taking the predicted traffic situation into consideration, to reach the navigation destination. Since central computing device 20 also ascertains the trajectories for all other vehicles, an accident-free driving is advantageously supported. The trajectory (e.g., in the form of the position and speed of several points in time in the future) is then communicated to automated vehicle 200. Vehicle 200 is equipped with corresponding control units to cover the trajectory based on the transmitted trajectory data.

In one advantageous variant, surroundings sensors, such as a sensor 215, installed in vehicle 200 or in the infrastructure installations may be used to provide feedback to central computing device 20 so that no collision takes place. Sensors in the infrastructure installations may also be used to report that road users without a vehicle-to-infrastructure unit are situated in the monitored territory.

The provided device 100 may advantageously also be used to offer services subject to fees (e.g., with the aid of a software app, hardware for receiver/transmitter, rates, etc.).

Preferably, it may be provided that device 100 does not cover an entire urban area, but only arterial roads having a high traffic volume. In one other variant, it may also be provided that a smart phone situated inside or outside automated vehicle 200 carries out the communication with computing device 20. For example, it is also possible that pedestrians or bicyclists having a smart phone are identified by sensor unit 10, infrastructure installations (e.g., traffic lights, barriers, etc.) then being suitably operated by computing device 20.

Advantageously, it may also be provided to book additional services via device 100, such as a parking lot, services at the destination, etc.

Advantageously, it may be provided for device 100 to have at least a simple redundant design so that an enhanced safety level of the operation is supported.

Figure 2:
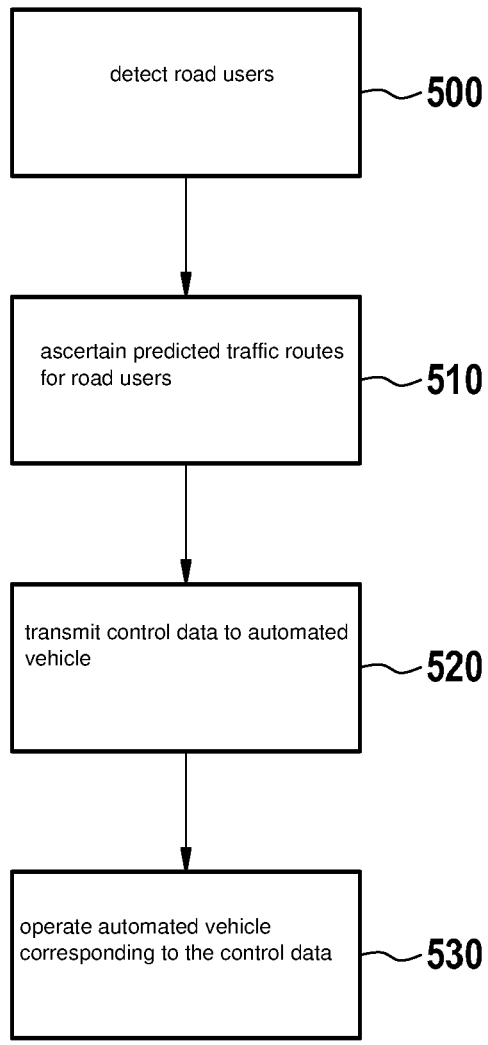
FIG. 2 shows a schematic sequence of one specific embodiment of the provided method for steering a traffic flow.

FIG. 2 shows a schematic sequence of one specific embodiment of the method according to the present invention.

In a step 500, a detection of road users 200, 300, 400 by sensors with the aid of the at least one automated vehicle 200 and/or with the aid of sensor systems in an infrastructure is carried out.

In a step 510, an ascertainment of predicted traffic routes for road users 200, 300, 400 with the aid of a computing device 20 based on defined criteria is carried out.

In a step 520, a transmission of control data D corresponding to the predicted traffic route to automated vehicle 200 is carried out.

In a step 530, an operation of automated vehicle 200 corresponding to control data D is carried out.

The provided method may advantageously be implemented with the aid of a software program running on computing device 20, whereby a simple adaptability of the method is supported.

Those skilled in the art will suitably modify the features of the present invention and/or combine them with one another, without departing from the core of the present invention.

What is claimed is:

1. A method for operating an automated vehicle, comprising the following steps:
   detecting road users by sensors using the automated vehicle and/or using sensor systems in an infrastructure;
   ascertaining, by a computer that is external from the automated vehicle, predicted traffic routes for the road users by predicting respective trajectories of the road users according to a stored digital map;
   transmitting control data corresponding to the predicted traffic routes to the automated vehicle; and
   operating the automated vehicle according to the control data;
   wherein the method includes at least one of the following features (a)-(c):
   (a) the predicting of the respective trajectories of the road users according to the stored digital map includes predicting a trajectory of one of the road users without obtaining information provided by the one of the road users based on (1) the detection of the one of the road users in an area of the automated vehicle and (2) surroundings of the area indicated in the stored digital map;
   (b) the method further comprises, based on the predicted respective trajectories, generating and transmitting, by the computer, control data that controls at least one traffic infrastructure installation; and
   (c) the transmission of the control data to the automated vehicle is performed based on satisfaction of a condition that the area of the automated vehicle is a region having a predefined classification.

2. The method as recited in claim 1, wherein the control data are trajectory data.

3. The method as recited in claim 1, wherein sensors of the road users detect surroundings to produce sensor data that are transmitted to the computer.

4. The method as recited in claim 1, wherein the control data include defined sub-routes.

5. The method as recited in claim 1, further comprising the automated vehicle obtaining input, via a human machine interface, of an instruction to be autonomously operated according to the control data from the computer, the operating step being performed responsive to the obtaining of the input.

6. The method as recited in claim 5, wherein the instruction is input prior to the transmission of the control data.

7. The method as recited in claim 6, further comprising the computer transmitting to the automated vehicle a notice that control by the computer is available, the human machine interface providing an option to obtain the input in response to the notice.

8. The method as recited in claim 1, wherein the method comprises the generating and transmitting, by the computer and based on the predicted respective trajectories, the control data that controls the at least one traffic infrastructure installation.

9. The method as recited in claim 8, wherein the at least one traffic infrastructure installation that is controlled by the computer based on the predicted respective trajectories includes at least one of a traffic light and a traffic barrier.

10. The method as recited in claim 1, wherein the predicting of the respective trajectories of the road users according to the stored digital map includes the predicting of the trajectory of one of the road users without obtaining information provided by the one of the road users based on (1) the detection of the road user in the area of the automated vehicle and (2) the surroundings of the area indicated in the stored digital map.

11. The method as recited in claim 1, wherein the transmission of the control data to the automated vehicle is performed based on the satisfaction of the condition that the area of the automated vehicle is the region having the predefined classification.

12. The method as recited in claim 11, wherein the predefined classification is a traffic volume classification.

13. A system for operating an automated vehicle, the system comprising:
   a sensor, wherein the sensor is configured to detect road users;
   a computer, wherein the computer is programmed to calculate predicted traffic routes for the road users by predicting respective trajectories of the road users according to a stored digital map; and
   a transmitter, wherein the transmitter is configured to transmit control data corresponding to the predicted traffic routes to the automated vehicle;
   wherein the system includes at least one of the following features (a)-(c):
   (a) the predicting of the respective trajectories of the road users according to the stored digital map includes predicting a trajectory of one of the road users without obtaining information provided by the one of the road users based on (1) the detection of the one of the road users in an area of the automated vehicle and (2) surroundings of the area indicated in the stored digital map;
   (b) the computer is programmed to, based on the predicted respective trajectories, generate and transmit control data that controls at least one traffic infrastructure installation; and
   (c) the transmission of the control data to the automated vehicle is performed based on satisfaction of a condition that the area of the automated vehicle is a region having a predefined classification.

14. The system as recited in claim 13, wherein the senor is installed in an infrastructure component.

15. The system as recited in claim 13, wherein the sensor is installed on the automated vehicle or on another automated vehicle.

16. A method, comprising:
   providing a system, the system including:
   a sensor, wherein the sensor is configured to detect road users;
   a computer, wherein the computer is programmed to calculate predicted traffic routes for the road users by predicting respective trajectories of the road users according to a stored digital map; and a transmitter, wherein the transmitter is configured to transmit control data corresponding to the predicted traffic routes to an automated vehicle; and using the control data for operating the automated vehicle in urban surroundings;

wherein the method includes at least one of the following features (a)-(c):

(a) the predicting of the respective trajectories of the road users according to the stored digital map includes predicting a trajectory of one of the road users without obtaining information provided by the one of the road users based on (1) the detection of the one of the road users in an area of the automated vehicle and (2) surroundings of the area indicated in the stored digital map;

(b) the method further comprises, based on the predicted respective trajectories, generating and transmitting, by the computer, control data that controls at least one traffic infrastructure installation; and (c) the transmission of the control data to the automated vehicle is performed based on satisfaction of a condition that the area of the automated vehicle is a region having a predefined classification.

17. A non-transitory computer-readable data carrier on which is stored a computer program including program code that is executable by a computer that is external to an automated vehicle and that, when executed by the computer, causes the computer to perform a method, the method comprising:

obtaining sensor data from a sensor, the sensor data being of detected road users;

ascertaining predicted traffic routes for the road users by predicting respective trajectories of the road users according to a stored digital map; and transmitting to the automated vehicle control data that corresponds to the predicted traffic routes and that controls an automated operation of the automated vehicle;

wherein the method includes at least one of the following features (a)-(c):

(a) the ascertaining of the predicted traffic routes for the road users according to the stored digital map includes predicting a trajectory of one of the road users without obtaining information provided by the one of the road users based on (1) the detection of the one of the road users in an area of the automated vehicle and (2) surroundings of the area indicated in the stored digital map;

(b) the method further comprises, based on the predicted respective trajectories, generating and transmitting control data that controls at least one traffic infrastructure installation; and (c) the transmission of the control data to the automated vehicle is performed based on satisfaction of a condition that the area of the automated vehicle is a region having a predefined classification.

* * * * *